US011867561B2

(12) United States Patent
Frank et al.

(10) Patent No.: US 11,867,561 B2
(45) Date of Patent: Jan. 9, 2024

(54) METHOD FOR OPERATING A THERMAL IMAGING CAMERA, AND THERMAL IMAGING CAMERA

(71) Applicant: Robert Bosch GmbH, Stuttgart (DE)

(72) Inventors: Michael Frank, Bretten (DE); Patrick Meyer, Leinfelden-Echterdingen (DE); Axel Rumberg, Karlsruhe (DE); Mike Uhlig, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 307 days.

(21) Appl. No.: 17/289,106

(22) PCT Filed: Oct. 18, 2019

(86) PCT No.: PCT/EP2019/078349
§ 371 (c)(1),
(2) Date: Apr. 27, 2021

(87) PCT Pub. No.: WO2020/088951
PCT Pub. Date: May 7, 2020

(65) Prior Publication Data
US 2022/0003608 A1 Jan. 6, 2022

(30) Foreign Application Priority Data
Oct. 31, 2018 (DE) ...................... 10 2018 218 726.6

(51) Int. Cl.
*G01N 25/00* (2006.01)
*G01J 5/02* (2022.01)
(Continued)

(52) U.S. Cl.
CPC ............ *G01J 5/0265* (2013.01); *G01J 5/025* (2013.01); *G01N 25/00* (2013.01); *G08B 21/20* (2013.01);
(Continued)

(58) Field of Classification Search
CPC .... G01J 5/028; G01J 5/025; G01J 5/07; G01J 5/0265; G01J 2005/0077; G01J 5/10;
(Continued)

(56) References Cited

U.S. PATENT DOCUMENTS 5,367,616 A * 11/1994 Yoshida .................... G06T 7/12
345/442
6,920,236 B2 * 7/2005 Prokoski ................ G06V 40/16
356/71
(Continued)

FOREIGN PATENT DOCUMENTS

CN 207717125 U * 8/2018 ............. G08B 21/20
DE 101 37 889 A1 2/2003
(Continued)

OTHER PUBLICATIONS

International Search Report corresponding to PCT Application No. PCT/EP2019/078349, dated Feb. 6, 2020 (German and English language document) (6 pages).
(Continued)

*Primary Examiner* — Gail Kaplan Verbitsky
(74) *Attorney, Agent, or Firm* — Maginot, Moore & Beck LLP

(57) ABSTRACT

A method for operating a thermal imaging camera includes measuring two-dimensional temperature information including a thermal image of a setting using an infrared detector array of the thermal imaging camera, the infrared detector array including a plurality of pixels sensitive to infrared radiation. At least one of ambient humidity information and ambient air temperature information is provided. An evaluation device is used to calculate two-dimensional information about a mold formation risk. The method includes generating a mold risk map of the setting using a mold growth model and using the calculated two-dimensional temperature information, and the provided at least one
(Continued)

of ambient humidity information and ambient air temperature information.

15 Claims, 7 Drawing Sheets

(51) Int. Cl.
  *G08B 21/20* (2006.01)
  *G01J 5/10* (2006.01)
  *G01J 5/00* (2022.01)
(52) U.S. Cl.
  CPC .................. *G01J 5/026* (2013.01); *G01J 5/10* (2013.01); *G01J 2005/0077* (2013.01)
(58) Field of Classification Search
  CPC ......... G01J 5/026; G08B 21/20; G08B 13/19; G01N 25/00
  USPC ................................................ 374/121, 45, 4
  See application file for complete search history.

(56) References Cited

U.S. PATENT DOCUMENTS

| | | | | |
|---|---|---|---|---|
| 7,591,583 | B2* | 9/2009 | Foes | G06T 7/0004 374/45 |
| 8,498,836 | B2* | 7/2013 | Carlson | G01M 99/002 702/130 |
| 2005/0089076 | A1* | 4/2005 | Lindstrom | G01N 25/66 348/E5.09 |
| 2005/0259715 | A1* | 11/2005 | Lee | G01N 25/72 374/124 |
| 2007/0026107 | A1 | 2/2007 | Wang et al. | |
| 2009/0304041 | A1* | 12/2009 | Streicher | G01N 25/66 340/604 |

FOREIGN PATENT DOCUMENTS

| | | | |
|---|---|---|---|
| DE | 20 2005 015 397 U1 | 2/2007 | |
| DE | 20 2006 020 449 U1 | 10/2008 | |
| DE | 10 2010 052 327 B4 | 12/2012 | |
| DE | 10 2012 203 996 A1 | 10/2013 | |
| DE | 10 2014 107 690 A1 | 12/2015 | |
| DE | 10 2016 211 840 B3 | 10/2017 | |
| DE | 102016211840 B3 * | 10/2017 | ............. G08B 21/20 |
| EP | 1 678 485 B1 | 2/2008 | |
| EP | 1678485 B1 * | 2/2008 | ............. G01N 25/66 |
| JP | 2003065813 A * | 3/2003 | |
| JP | 2004525583 A | 8/2004 | |
| JP | 2004528085 A * | 9/2004 | |
| KR | 101742059 B1 * | 5/2017 | |
| KR | 10-1742059 B1 | 6/2017 | |
| WO | WO-2005040779 A1 * | 5/2005 | ............. G01N 25/66 |
| WO | WO-2008130907 A1 * | 10/2008 | ........... A61B 5/0064 |

OTHER PUBLICATIONS

Sedlbauer, K., "Prediction of mould fungus formation on the surface of and inside building components," dissertation, University of Stuttgart, 2001 (247 pages)(available at https://www.google.com/url?sa=t&rct=j&q=&esrc=s&source=web&cd=&ved=2ahUKEwjV2rSaj5_wAhUTbc0KHX9rDU4QFjABegQIAxAD&url=https%3A%2F%2Fwww.ibp.fraunhofer.de%2Fcontent%2Fdam%2Fibp%2Fen%2Fdocuments%2Fks_dissertation_etcm1021-30729.pdf&usg=AOvVaw1Fdpt9vcUJ9qSMpkYbgkma).

Viitanen, H, et al. "Improved Model to Predict Mold Growth in Building Materials," Proceedings of the 10th Thermal Performance of the Exterior Envelopes of Whole Buildings Conference ASHRAE, 2007 (8 pages).

\* cited by examiner

US 11,867,561 B2

METHOD FOR OPERATING A THERMAL IMAGING CAMERA, AND THERMAL IMAGING CAMERA

This application is a 35 U.S.C. § 371 National Stage Application of PCT/EP2019/078349, filed on Oct. 18, 2019, which claims the benefit of priority to Serial No. DE 10 2018 218 726.6, filed on Oct. 31, 2018 in Germany, the disclosures of which are incorporated herein by reference in their entirety.

The disclosure relates to a method for operating a thermal imaging camera, wherein two-dimensional information about a mold formation risk is calculated by means of an evaluation device using a mold growth model and using two-dimensional temperature information, ambient humidity information, and ambient air temperature information.

BACKGROUND

Pyrometers for studying a measurement object are known from the prior art, for example from EP 1 678 485 B1, which are equipped with an ambient humidity and ambient temperature sensor, wherein a risk of possible water condensation on the measurement object is assessed based on measurement data of these sensors. A similar method is known from DE 10 2010 052 327 B4.

A device for determining the surface moisture of a measurement object is known from DE 20 2005 015 397 U1, in which a temperature of a wall is measured using a pyrometer, a room dewpoint temperature is determined from a measured ambient humidity, and a surface moisture is calculated directly from the wall temperature and the room dewpoint temperature.

In addition, early warning systems are known, for example from DE 10 2014 107 690 A1, which characterize a room climate continuously, in particular in specific time intervals, using ambient humidity and ambient temperature sensors and assess a risk of mold formation.

SUMMARY

The disclosure is directed to a handheld thermal imaging camera for contactless determination of two-dimensional temperature information of a setting, in particular for contactless determination of a thermal image of a setting. The handheld thermal imaging camera is provided for contactless determination of two-dimensional information about a mold formation risk, in particular for contactless determination of a mold risk map of the setting, according to the method according to the disclosure.

The handheld thermal imaging camera includes at least one infrared detector array, which consists of a plurality of pixels sensitive to infrared radiation. An evaluation device of the thermal imaging camera is provided to calculate the two-dimensional information about a mold formation risk, in particular the mold risk map of the setting, using a mold growth model and using two-dimensional temperature information, ambient humidity information, and ambient air temperature information with application of the method according to the disclosure.

"Thermal imaging camera" refers to a device for contactless measurement of two-dimensional temperature information of a setting with output of at least one item of information relating to the two-dimensional temperature information, for example with output of one or more temperature specifications, advantageously two or more temperature measured values, a temperature distribution, or the like. This two-dimensional temperature information is typically implemented in the form of a thermal image composed of a plurality of location-resolved and/or solid-angle-resolved temperature measured values.

A "handheld" thermal imaging camera is to be understood in particular to mean that the thermal imaging camera can be transported solely using the hands, in particular using one hand, without the aid of a transport machine. In particular, the thermal imaging camera can also be guided in a handheld manner through space during a measuring procedure in a movement freely executed by an operator of the thermal imaging camera. The mass of the handheld thermal imaging camera is in particular less than 5 kg, advantageously less than 3 kg, and particularly advantageously less than 1 kg. The handheld thermal imaging camera preferably includes a housing having a handle or a handle region, using which the thermal imaging camera can be guided by an operator.

In one embodiment, the handheld thermal imaging camera includes a housing which accommodates at least the essential functional components of the thermal imaging camera. In particular, the housing accommodates at least one control device, an infrared detector array, an input device and/or an output device, in particular a display device such as a display screen or the like, and a power supply device. The housing preferably also accommodates the evaluation device. In particular, the components are housed by more than 50%, preferably more than 75%, and particularly preferably 100% of their total volume in the housing of the thermal imaging camera. In this way, a particularly compact thermal imaging camera which can be guided easily with one hand by an operator can be implemented. Furthermore, the components of the thermal imaging camera may advantageously be protected in this way by a housing of the thermal imaging camera from damage and environmental influences, for example from the penetration of moisture and dust.

An "output device" is to be understood as at least one means which is provided for the purpose of outputting at least one changing item of information in an acoustic, optical, and/or tactile manner to an operator. The output device is used to output at least those items of information to the operator of the thermal imaging camera which are obtained while using the thermal imaging camera. In particular, a result of the measurement and evaluation can be output by means of the output device. The output can be implemented in particular by means of a display screen, in particular a touch-sensitive display screen. The output device is housed in one embodiment of the thermal imaging camera in the housing of the thermal imaging camera. Furthermore, items of information or results to be output can also be output to the control device and/or, in particular to increase the level of user comfort, to a system processing data. The latter comprises at least one output of information to an external device such as a smartphone, a tablet PC, a PC, and to another external data device which appears reasonable to a person skilled in the art and which is connected to the thermal imaging camera via a data communication interface thereof. In particular, the output device can be housed directly in the housing of the thermal imaging camera and can additionally also be supplemented via external output devices. Using the information output by means of the output device to an operator of the thermal imaging camera, it is possible for the operator of the thermal imaging camera to arrive at an intuitively comprehensible result after carrying out a measurement and evaluation.

The thermal imaging camera is configured for the purpose of detecting infrared radiation emitted in a solid angle range from the setting for the contactless determination of two-dimensional temperature information of the setting, in particular for the contactless determination of a thermal image of the setting. It is to be noted that in the context of this document, the term "infrared radiation" is to be understood as synonymous with thermal radiation. The solid angle range—which can also be referred to as "measuring range"—is understood as a geometrical, locally delimited range which comprises at least one detail of the setting to be studied, the infrared radiation of which leaves the object or the objects of the setting in the direction of the thermal imaging camera and is at least partially detected by the thermal imaging camera. The solid angle range is typically defined by the entry opening of the thermal imaging camera or by the optical properties of the thermal imaging camera (for example by zoom, angle coverage, aperture angle, etc.).

The thermal imaging camera includes at least one infrared detector array for measuring infrared radiation. The infrared detector array includes a plurality of pixels sensitive to infrared radiation. The infrared detector array captures infrared radiation emitted in the solid angle range and projected on its surface and generates a detection signal based on the detected intensity of incident infrared radiation. The infrared detector array includes a two-dimensional detection surface on a surface facing toward the setting, on which the plurality of pixels sensitive to infrared radiation is arranged. Each of the pixels of the infrared detector array—presuming illumination by means of infrared radiation—can determine an item of image information and generate a detection signal therefrom. The detection signal provided by each pixel can subsequently be used to determine an item of temperature information. In particular, the detection signal of each pixel can be relayed to the control device of the thermal imaging camera. The detection signal can be evaluated individually and/or in combination with detection signals of other pixels by the control device.

Each pixel of the infrared detector array represents an element sensitive to infrared radiation and is provided to capture radiation from the infrared range, in particular from the middle infrared range in the wavelength range between 3 μm and 50 μm, and convert it into a detection signal, in particular an electrical detection signal. The detection signals generated by such radiation-sensitive elements are typically dependent on an infrared radiation intensity incident on the respective element. Examples of such elements sensitive to infrared radiation are, inter alia, photodiodes, bolometers, pyroelectric sensors, P/N diodes, PIN diodes, avalanche photodiodes (APD), (modulated) CCD chips, and CMOS pixels, however other elements sensitive to infrared radiation which appear reasonable to a person skilled in the art can also be understood to be included.

In one embodiment of the thermal imaging camera, the plurality of pixels is arranged like a matrix on the surface of the infrared detector array facing toward the setting. The number of pixels is, for example, 80×80 pixels, preferably 360×240 pixels, particularly preferably 640×480 pixels. The number of pixels defines the resolution of the thermal imaging camera, i.e., in particular the resolution of two-dimensional temperature information measured by means of the thermal imaging camera. Particularly homogeneous and in particular continuous capture of infrared radiation from the solid angle range can be carried out by the matrix-like arrangement, since the infrared detector array is provided homogeneously and in particular continuously with pixels.

Each of the pixels of the infrared detector array is connectable for signaling to the control device directly or indirectly via further interconnected components. In particular, an indirect signaling connection of the pixels to the control device can also be implemented via switching elements, for example multiplexers or other selection switches, which are designed to relay detection signals of multiple pixels selectively. In this way, in particular detection signals of individual pixels or a group of pixels can be relayed independently of detection signals of other pixels to the control device and can be evaluated thereby.

The control device is used to control, in particular to operate, the thermal imaging camera. The control device is at least provided for the purpose of receiving detection signals generated by the infrared detector array, in particular from the pixels connectable for signaling to the control device, evaluating them, and carrying out an evaluation of the two-dimensional temperature information of the setting based on detection signals of at least a majority of illuminated pixels of the infrared detector array. In particular, the control device is provided to carry out an evaluation of a thermal image based on detection signals of at least a majority of illuminated pixels. In this way, the control device is used to "determine two-dimensional temperature information, in particular a thermal image, from measured infrared radiation". The evaluated two-dimensional temperature information, in particular a thermal image, can be provided by the control device for further processing and/or output to an operator of the thermal imaging camera by means of the output device and/or an external device by means of a data communication interface of the thermal imaging camera.

"Provided" is to be understood hereinafter as especially "programmed", "designed", "conceived", and/or "equipped". An object being "provided" for a specific function is to be understood in particular to mean that the object fulfills and/or executes this specific function in at least one application and/or operating state and/or is designed to fulfill the function.

The "evaluation device" is to be understood in particular as a device which includes at least one information input, an information processing unit for processing, and an information output for relaying the processed and/or evaluated items of evaluation information. The evaluation device advantageously includes components which comprise at least one processor, a memory, and an operating program having evaluation and calculation routines. In one embodiment, the electronic components of the evaluation device can be arranged on a circuit board or printed circuit board of the thermal imaging camera, preferably on a common circuit board with the control device of the thermal imaging camera for controlling the thermal imaging camera. Furthermore, the control device and the evaluation device of the thermal imaging camera can also be embodied as a single component, for example in the form of a microcontroller. The evaluation device is provided to calculate the two-dimensional information about a mold formation risk, in particular the mold risk map of the setting, using a mold growth model and using the two-dimensional temperature information, the ambient humidity information, and the ambient air temperature information. The evaluation device is accordingly especially configured and provided to calculate the two-dimensional information about a mold formation risk, in particular the mold risk map of the setting. For this purpose, the evaluation device includes specially allocated routines and/or algorithms, in particular routines and/or algorithms for modeling a mold growth. The mold growth model, i.e., corresponding functions, routines, algorithms, databases, tables, or the like, can be allocated internally in the device, in particular stored, or provided by an external device during the evaluation.

A "mold growth model" is to be understood in particular as a calculation model which enables a mold formation to be characterized, in particular predicted, based on biological, biohygrothermic, physical, chemical, or also empirical findings, and thus information about a mold formation risk to be evaluated. In particular, in this way information about a mold formation risk relating to the studied setting can be determined and assessed. Examples of such mold growth models are the isopleth model or the Viitanen model, which are known to a person skilled in the art from the prior art (for example from Sedlbauer, Vorhersage von Schimmelpilzbildung auf and in Bauteilen [prediction of mildew formation on and in components], dissertation University of Stuttgart, 2001 or Viitanen et al., Mould growth in pine and spruce sapewood in relation to air humidity and temperature, Uppsala, Swedish University of Agricultural Sciences, Department of Forest Products, 1991). In particular, such models represent calculation methods to assess the risk of growth of mildew on surfaces of the studied setting for nonstationary boundary conditions. According to the disclosure, in this way particularly precise and reliable information with respect to the mold formation risk can be output. In particular, the information with respect to the mold formation risk is thus calculated based on the biological growth properties of mildew respectively existing during a measurement scenario, measured values of ambient air temperature, ambient humidity, and surface temperature of the setting.

The described thermal imaging camera is used as the foundation for the method described in the following. In particular, the evaluation device of the thermal imaging camera is designed and provided to carry out the proposed method. The method for operating the thermal imaging camera starts from the presented thermal imaging camera and includes at least the following method steps:

measuring, in particular contactless measuring, of two-dimensional temperature information, in particular a thermal image of a setting, by means of the infrared detector array of the thermal imaging camera, which consists of a plurality of pixels sensitive to infrared radiation, providing ambient humidity information and/or ambient air temperature information.

According to the disclosure, the two-dimensional information about a mold formation risk, in particular a mold risk map of the setting, is calculated by means of an evaluation device using a mold growth model and using the two-dimensional temperature information, the ambient humidity information, and the ambient air temperature information.

"Ambient air temperature information" is understood in particular as information relating to the temperature surrounding the thermal imaging camera, i.e., for example, the temperature in the spatial surroundings of the thermal imaging camera. For example, if the thermal imaging camera is used in a closed space, the ambient air temperature thus preferably corresponds to the room temperature. In contrast, if the thermal imaging camera is used in an open area, the ambient air temperature would thus be the outside temperature in the region of the thermal imaging camera. "Ambient humidity information" is equivalently understood as information relating to a relative or absolute moisture content of the air surrounding the thermal imaging camera.

"Providing ambient humidity information and/or ambient air temperature information" is to be understood in particular to mean that the evaluation device which carries out the method according to the disclosure is provided with corresponding information. In one embodiment of the method, the ambient humidity information and/or the ambient air temperature information is provided by an operator. The provision can be carried out in particular by an input or selection by an operator, for example by means of an input device or by means of a menu selection or the like. In this way, a particularly compact thermal imaging camera consisting of few components can be specified. In an alternative or additional embodiment of the method, the ambient humidity information and/or the ambient air temperature information is provided, in particular measured, by means of a sensor system arranged in the or on the thermal imaging camera for determining ambient humidity information and/or ambient air temperature information. For the purpose of determining the ambient humidity information and/or the ambient air temperature information, the handheld thermal imaging camera accordingly has a sensor system which is integrated into the thermal imaging camera or arranged on the thermal imaging camera. A particularly precise and reliable determination of this information can be implemented by the measurement of the ambient humidity information and/or ambient air temperature information. In particular, information adapted to a measurement scenario can be provided in this way to carry out the method. Furthermore, incorrect inputs, in particular due to deviations from actually existing ambient humidity information and/or ambient air temperature information, can be avoided. In an alternative or additional embodiment of the method thereto, the ambient humidity information and/or the ambient air temperature information is provided, in particular measured and transmitted, by means of a sensor system external to the thermal imaging camera for determining ambient humidity information and/or the ambient air temperature information. By providing the ambient humidity information and/or the ambient air temperature information by means of an external sensor system, the risk of inaccurate measurements or incorrect measurements, for example as a result of a thermal imaging camera not acclimated to the surroundings, may be reduced or advantageously entirely avoided. In particular, it can furthermore be provided that items of information which are provided by an internal sensor system and an external sensor system are matched and the operator of the thermal imaging camera is notified of the risk of an inaccurate measurement if the items of information should differ from one another by a specific threshold. Alternatively or additionally, at least one item of ambient humidity information and/or ambient air temperature information can be used for correction and/or calibration purposes of the thermal imaging camera.

The sensor system is to be understood in particular as at least one sensor for measuring an absolute and/or relative ambient humidity and/or a surroundings sensor of the air surrounding the sensor. The at least one sensor is provided for the purpose of providing the ambient humidity information and/or the ambient air temperature information as an output signal. In the case of a sensor system arranged in the or on the thermal imaging camera for determining ambient humidity information and/or ambient air temperature information, the at least one sensor is accordingly arranged in or on the thermal imaging camera and is connected or connectable in at least one operating state (for example in a wired or wireless manner) for signaling to the control device and/or the evaluation device. In the embodiment of the thermal imaging camera in which the sensor system is implemented externally to the thermal imaging camera, the thermal imaging camera includes a data communication interface for transmitting at least the ambient humidity information and/or the ambient air temperature information from the external sensor system. The data communication interface is to be understood in particular as a means which is provided for the purpose of accepting at least one item of information from the external sensor system and relaying it to the control device and/or the evaluation device. The data communication interface is in particular provided for establishing a connection to an external device, for example a smartphone, a tablet PC, a PC, a thermometer, a data logger, or the like. The data communication interface thus enables the provision of ambient humidity information and/or the ambient air temperature information from the external sensor system connected to the data communication interface. In particular, the data communication interface can be implemented as an interface provided for in particular wireless communication, by means of which the thermal imaging camera can exchange data, in particular can send and/or receive operating parameters. The data communication interface is connected for signaling at least to the control device and/or the evaluation device of the thermal imaging camera. The data communication interface preferably uses a standardized communication protocol for transmitting electronic data, in particular digital data. The data communication interface advantageously comprises a wireless interface, in particular, for example, a WLAN, Bluetooth, infrared, NFC, RFID, GSM, UMTS, and/or LTE interface or another wireless interface which appears reasonable to a person skilled in the art. Alternatively or additionally, the data communication interface can also include a wired adapter, for example a USB or micro-USB adapter.

In one embodiment of the method, the ambient humidity information and/or the ambient air temperature information is determined and provided from a long-term measurement of the ambient humidity and/or the ambient air temperature. The evaluation device is accordingly provided for the purpose of recording measured values determined over a longer period for the ambient humidity of the room and/or measured values for the ambient air temperature of the room and analyzing and evaluating them using calculation models, in particular using mold growth models. In one exemplary embodiment, in particular the mean values of a long-term measurement of the ambient humidity and/or the ambient air temperature can be used as the ambient humidity information or as the ambient air temperature information, respectively, to carry out the method. In an alternative exemplary embodiment, maximum values determined during a long-term measurement of the ambient humidity and/or the ambient air temperature can also be used as the ambient humidity information or as the ambient air temperature information, respectively, for carrying out the method or the like. Therefore, in a particularly simple way, measured values can be recorded over a longer period, which can advantageously be used for evaluating the mold formation risk. The measured values can be determined continuously and/or in intervals and provided to the evaluation device for evaluation. Furthermore, the measured values can also be stored. With application of a mold growth model, for example the isopleth model or a physical model of a mold spore, particularly reliable information with respect to the mold formation risk can then be evaluated by means of the evaluation device. In particular, the mold formation risk on the studied surface of the setting can be assessed particularly reliably. In this case, not only an "actual situation" present at a given time is advantageously assessed, but also already recorded measured values are used. In this way, particularly precise and reliable information with respect to the mold formation risk can be output. In particular, the information with respect to the mold formation risk takes into consideration a development determined over a longer period of the determined information on the ambient humidity and/or the ambient air temperature of the room. In particular, it is thus possible to compensate for short-term variations in the ambient humidity and/or the ambient air temperature (for example a high ambient humidity due to showering). It is to be noted that a long-term measurement of the ambient humidity and/or the ambient air temperature can be carried out both by means of an (internal) sensor system arranged in the thermal imaging camera or on the thermal imaging camera and by means of the sensor system external to the thermal imaging camera. In the case of the external sensor system, it can be positioned for a longer period in the surroundings to be measured, for example on a surface to be studied. The measured values are, for example, first collected there and subsequently transmitted for evaluation to the thermal imaging camera. In the case of the internal sensor system, the thermal imaging camera itself can also be positioned for a longer period in the surroundings to be measured, for example on a tripod. In this way, the thermal imaging camera itself carries out the long-term measurement of the ambient humidity and/or the ambient air temperature.

"Calculating two-dimensional information about a mold formation risk using a mold growth model and using the two-dimensional temperature information, the ambient humidity information, and the ambient air temperature information" is to be understood to mean that two-dimensional information which permits a statement about a mold formation risk is determined by means of the evaluation device with application of evaluation routines, evaluation algorithms, evaluation functions, or the like, in particular also by means of database queries, which take into consideration and/or mathematically reproduce the mold growth model. The mold growth model, i.e., in particular the functions, routines, algorithms, tables, matrices, or the like, can be stored internally in the device in a database on a storage unit, in particular a storage unit of the control device of the thermal imaging camera. In an alternative or additional embodiment, the mold growth model can also be stored in an external database, in particular external to the device, which is advantageously always up-to-date. For example, the mold growth model can be stored in a database on a computer, a server, or on another data memory and/or data processing device which appears reasonable to a person skilled in the art and can be provided thereby when carrying out the method according to the disclosure. In particular, the provision of the mold growth model can also take place via an Internet access of the thermal imaging camera.

In relation to methods known from the prior art, which compare a surface temperature to a dewpoint temperature of the surroundings, it is taken into consideration by methods according to the disclosure that mildew formation can take place at humidity levels which are still very remote from a state of moisture saturation. In particular, in methods known from the prior art, only a risk of condensation is determined, but not information specifically related to a mold formation risk. The present disclosure therefore enables an operator of the thermal imaging camera to be supplied more precise and reliable information with respect to a mold formation risk and thus to protect an operator of the thermal imaging camera even more effectively and reliably from mold formation in rooms and/or on walls and/or surfaces.

In one embodiment of the method, in a further method step the mold growth model to be used is specified by an operator. In this way, the mold growth model to be used for the evaluation can be selected by an operator of the thermal imaging camera in accordance with their interest and/or adapted to the surroundings. In particular, the mold growth model can be specified as a result of an input or selection by an operator, for example by means of an input device or by means of a menu selection or the like. In one exemplary embodiment, an operator can choose, for example between an isopleth model and a Viitanen model. Information processing, in particular the functions, routines, algorithms, tables, matrices, or the like used for the evaluation by means of the evaluation device, may advantageously be adapted by the specification of the mold growth model to be used.

In one embodiment of the method, in a further method step a mold warning threshold is specified by an operator. In particular, a sensitivity of the thermal imaging camera can thus be set, at which a mold formation risk is determined, i.e., calculated and/or output. The thermal imaging camera can advantageously be adapted to the surroundings to be studied in this way, so that, for example, in a bathroom a different sensitivity can be used due to the generally higher ambient humidity than, for example, in a living area. In particular, it is conceivable to select the mold warning threshold from a predefined scale for a "mold risk tolerance", for example subdivided according to high mold risk tolerance (the determined and output items of information about a mold formation risk only relate to those regions of the setting which have a high mold formation risk), moderate mold risk tolerance (the determined and output items of information about a mold formation risk relate to those regions of the setting which have a moderate mold formation risk), and low mold risk tolerance (the determined and output items of information about a mold formation risk relate to those regions of the setting which already have a low mold formation risk). In particular, these regions can also be displayed in a color representation of a mold risk map output by means of the thermal imaging camera as different colored regions (e.g., red for high mold formation risk, yellow for moderate mold formation risk, and green for low mold formation risk). In particular using an isopleth model, the calculation of the two-dimensional information about a mold formation risk is carried out by calculating a spore germination time or a mycelium growth to be expected as a function of the input variables of the two-dimensional temperature information, the ambient humidity information, and the ambient air temperature information. It is possible to differentiate, for example, between multiple isopleth systems—which each characterize mold growth with respect to different endangerment classes, various substrate types, time-dependent curves, or the like. The lowest iso-line (called "LIM") represents the characteristic curve, which when moisture levels fall below it toward lower moisture levels, biological activity (i.e., mold growth) no longer occurs at all. In this way, for example, a mold warning threshold can be specified via the selection or specification of an iso-line.

In one embodiment of the method, in a further method step, a material characteristic value relating to the setting, in particular relating to a studied surface of the setting, is specified by an operator. A material characteristic value can characterize in particular a substrate structure (roughness, porosity, or the like), a substrate substance (materials such as concrete, wallpaper, or the like), a pH value of the substrate, or the like of the substrate (surface) to be studied with respect to the mold growth risk. In this way, in the determination of the information about the mold formation risk, a composition of the surface to be studied for mold formation risk in the setting, i.e., the mold growth substrate, can be taken into consideration particularly well. In particular, the material characteristic value can relate to the biological suitability of the surface, i.e., of the mold growth substrate, with respect to mold growth. Such a material characteristic value can relate, for example to the roughness, a degree of soiling, the material, the chemical composition, or the like of the surface and can thus characterize the breeding ground for mold growth. The specification can be carried out in particular by an input or selection by an operator, for example by means of an input device or by means of a menu selection or the like. In particular, the material characteristic value can be specifiable or settable manually by an operator of the thermal imaging camera. For this purpose, the thermal imaging camera can in particular include an input device. For example, a material characteristic value can be selectable from a material table, which links possible materials of the surface and associated material characteristic values. This table can, for example, be stored in the thermal imaging camera or retrievable via the data communication interface from an external device, for example a computer, a server, or the like. The material characteristic value is in particular provided to the evaluation device, which carries out the method according to the disclosure. In particular, this material characteristic value can be used for evaluating the information about a mold formation risk and can thus be incorporated into the mold growth model. In this way, a particularly well-founded and precise calculation of the two-dimensional information about a mold formation risk can be carried out.

Alternatively or additionally, the material characteristic value can also be automatically settable. For this purpose, in particular an emissivity of the surface to be studied can also be used as an indicator, which can be implemented as settable by an operator, for example. A low emissivity, for example as is characteristic in tiles or metallic surfaces, typically indicates a poor breeding ground for mold spores. In contrast thereto, a high emissivity, as is characteristic, for example in wallpapers, carpets, wood, or the like, typically indicates a good breeding ground for mold spores. In this way, the thermal imaging camera can adapt the material characteristic value automatically using the specifiable or settable emissivity or output suggestions of possible material characteristic values, in particular for their selection, to the operator of the thermal imaging camera.

In one embodiment of the method, the two-dimensional information about a mold formation risk, in particular the mold risk map of the setting, is output with the two-dimensional temperature information, in particular with the thermal image of the setting overlaid on a display screen of the thermal imaging camera. The thermal imaging camera accordingly includes a display screen by means of which the two-dimensional information about a mold formation risk, in particular a mold risk map of the setting, can be output. In particular, the information about a mold formation risk can be displayed and output in a manner superimposed or overlaid with the two-dimensional temperature information, i.e., in particular with the thermal image. In particular, the "superposition" is to be understood as the superposition, overlay, combination, or the like of at least the two-dimensional temperature information and the information relating to the mold formation risk. In this way, a combined representation in the form of an "integrated image" can be implemented. The combined representation is provided for the purpose of being output by means of the display screen to an operator of the thermal imaging camera. The superimposed or overlaid representation represents an interpretation aid and/or representation aid which is comprehensible particularly intuitively and which facilitates the interpretation and assessment of the two-dimensional temperature information and the information relating to the mold formation risk displayed by means of the display screen for an operator of the thermal imaging camera. In one exemplary embodiment, the two-dimensional temperature information can be reproduced by means of a color representation (heat map), while the two-dimensional information about a mold risk is overlaid by means of a shading, a border, a color highlight, or the like and is thus displayed on the display screen. Furthermore, it is conceivable that a numeric value or text is displayed on the display screen, which outputs a notification about the two-dimensional information about a mold formation risk to an operator of the thermal imaging camera.

In one embodiment of the method, the two-dimensional information about a mold formation risk, in particular the mold risk map of the setting, is output superimposed with a visual image of the setting recorded by means of a camera of the thermal imaging camera on a display screen of the thermal imaging camera. The thermal imaging camera accordingly also includes a display screen in this embodiment, by means of which the two-dimensional information about a mold formation risk, in particular a mold risk map of the setting, can be output. In particular, the information about a mold formation risk can be displayed and output in a manner superimposed or overlaid with the visual image. In this way, a combined representation in the form of an "integrated image" can be implemented. The combined representation is provided for the purpose of being output by means of the display screen to an operator of the thermal imaging camera. The superimposed or overlaid representation represents an interpretation aid and/or representation aid which is comprehensible particularly intuitively and which facilitates the interpretation and evaluation of the information relating to the mold formation risk displayed by means of the display screen for an operator of the thermal imaging camera and in particular facilitates an assignment of the information relating to the mold formation risk to real features of the setting. In one exemplary embodiment, the two-dimensional information relating to the mold formation risk can be reproduced by means of a color representation (heat map), while the visual image is displayed overlaid as contours on the display screen.

The wording "displayable" makes it clear that during operation of the thermal imaging camera, the information relating to a mold formation risk is also actually displayed.

Using the method according to the disclosure, it is possible to supply more precise and reliable information with respect to a mold formation risk to an operator of the thermal imaging camera and thus to protect an operator of the thermal imaging camera even more effectively and reliably from mold formation in rooms and/or on walls and/or surfaces.

Furthermore, a system is proposed which comprises at least one thermal imaging camera according to the disclosure and at least one external sensor system for determining ambient humidity information and/or ambient air temperature information.

BRIEF DESCRIPTION OF THE DRAWINGS

The disclosure is explained in greater detail in the following description on the basis of exemplary embodiments illustrated in the drawings. The drawings, the description, and the disclosure contain numerous features in combination. A person skilled in the art will expediently also consider the features individually and combine them to form further reasonable combinations. Identical reference signs in the figures indicate identical elements.

In the Figures.

DETAILED DESCRIPTION

Figure 1:
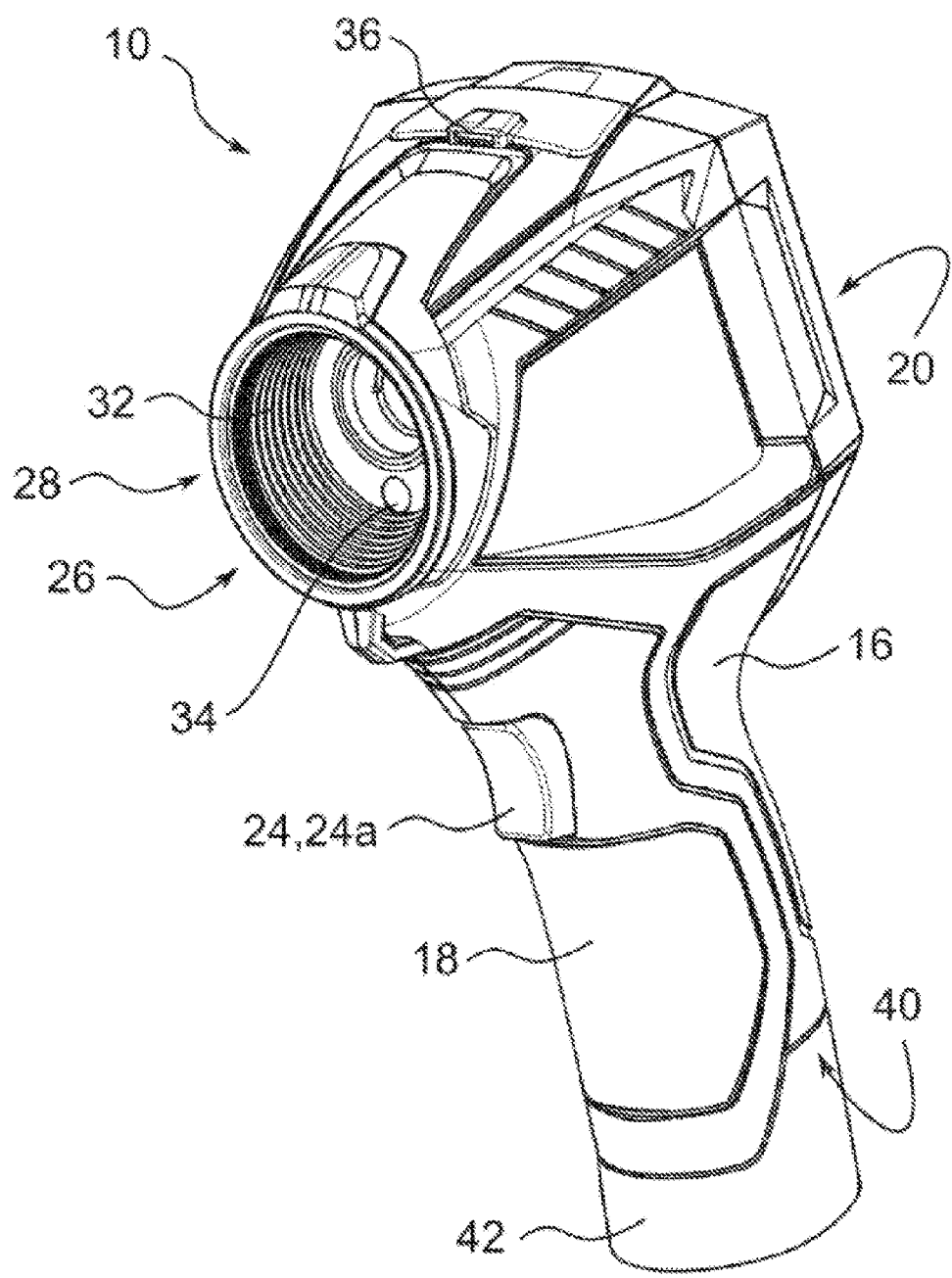
FIG. 1 shows an embodiment of a thermal imaging camera according to the disclosure in a perspective front view.
Figure 2:
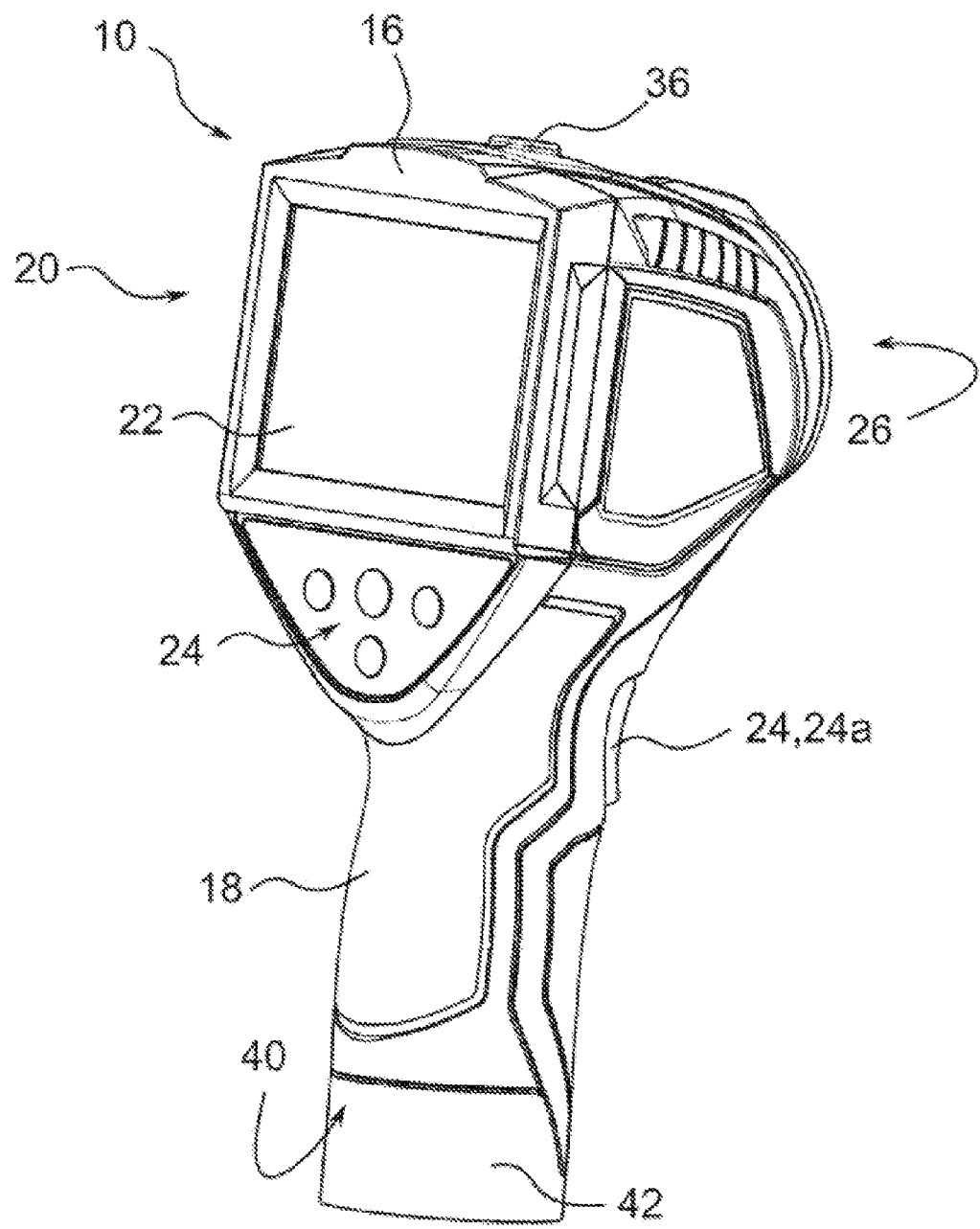
FIG. 2 shows an embodiment of a thermal imaging camera according to the disclosure in a perspective rear view.
Figure 3:
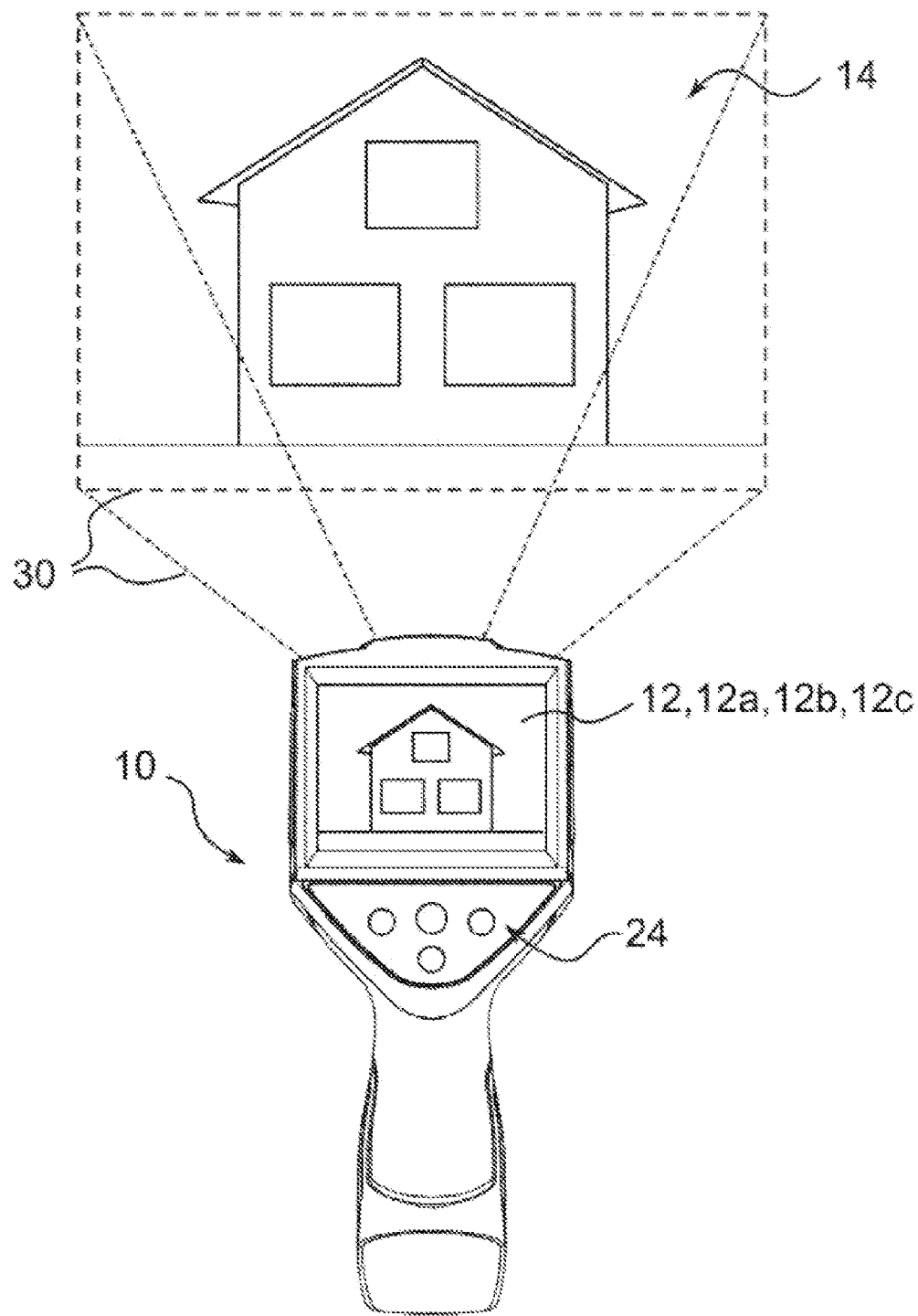
FIG. 3 shows a perspective, schematic rear view of an embodiment of the thermal imaging camera according to the disclosure in front of a setting to be measured.

A handheld thermal imaging camera 10 according to the disclosure is presented hereinafter. FIG. 1 and FIG. 2 each show an exemplary embodiment of this thermal imaging camera 10 in a perspective frontal view and in a perspective rear view, respectively. The thermal imaging camera 10 is used to determine two-dimensional temperature information 12a, in this exemplary embodiment a thermal image, of a setting 14 to be studied. The setting 14 can be any arrangement to be studied, which typically comprises objects, in particular surfaces of objects, or the like. Examples of such a setting 14 can be a house façade (cf. FIG. 3), an interior, or the like. A perspective schematic rear view of a thermal imaging camera 10 according to the disclosure in front of an exemplary setting 14 to be measured is shown in FIG. 3.

The handheld thermal imaging camera 10 comprises a housing 16 having a handle 18. The thermal imaging camera 10 can be held comfortably in one hand using the handle 18 during its use. The housing 16 of the thermal imaging camera 10 furthermore has an output device 22 in the form of a touch-sensitive display screen and an input device 24 in the form of operating elements for operator input and control of the thermal imaging camera 10 on a side 20 facing toward an operator during the use of the thermal imaging camera 10. In particular, the thermal imaging camera 10 also includes a button 24a, using which an operator can trigger the contactless determination of two-dimensional temperature information 12a of the setting 14 to be studied and the contactless determination of two-dimensional information 12b about a mold formation risk.

An entry opening 28 into the housing 16 is provided on the side 26 of the housing 16 facing away from the operator. The entry opening 28 defines (possibly in cooperation with an optical unit (not shown here) of the thermal imaging camera 10) the capture range of the thermal imaging camera 10, which is shown by dashed lines in FIG. 3 by the solid angle range 30. The infrared radiation emitted in this solid angle range 30 or in these solid angle ranges 30 from the setting 14, in particular from the objects of the setting 14, is captured by the thermal imaging camera 10. A lens system as an optical unit (not shown in greater detail here) is located in a light tube 32, which reduces scattered light, directly behind the entry opening 28. The lens system is transmissive for radiation in the middle infrared range and is used for focusing infrared radiation on an infrared detector array 48 (cf. FIG. 5) of the thermal imaging camera 10.

A camera 34 (cf. FIG. 3) operating in the visual spectrum for recording visual images 12c is located in the housing 16 on the side 26 of the housing 16 facing away from the operator during the use of the thermal imaging camera 10. Such images 12c can be output jointly with two-dimensional temperature information 12a from a measurement carried out by the operator and/or jointly with two-dimensional information 12b about a mold formation risk, in particular output in a manner at least partially superimposed or overlaid with the two-dimensional temperature information 12a or with the two-dimensional information 12b about a mold formation risk. Furthermore, the thermal imaging camera 10 includes a sensor system 36 arranged on the thermal imaging camera 10 for determining ambient humidity information and ambient air temperature information.

On the lower side of the thermal imaging camera 10, the handle 18 furthermore includes a receptacle 40 for accommodating an energy storage unit 42, which can be embodied, for example, in the form of a rechargeable accumulator or in the form of batteries.

Figure 4:
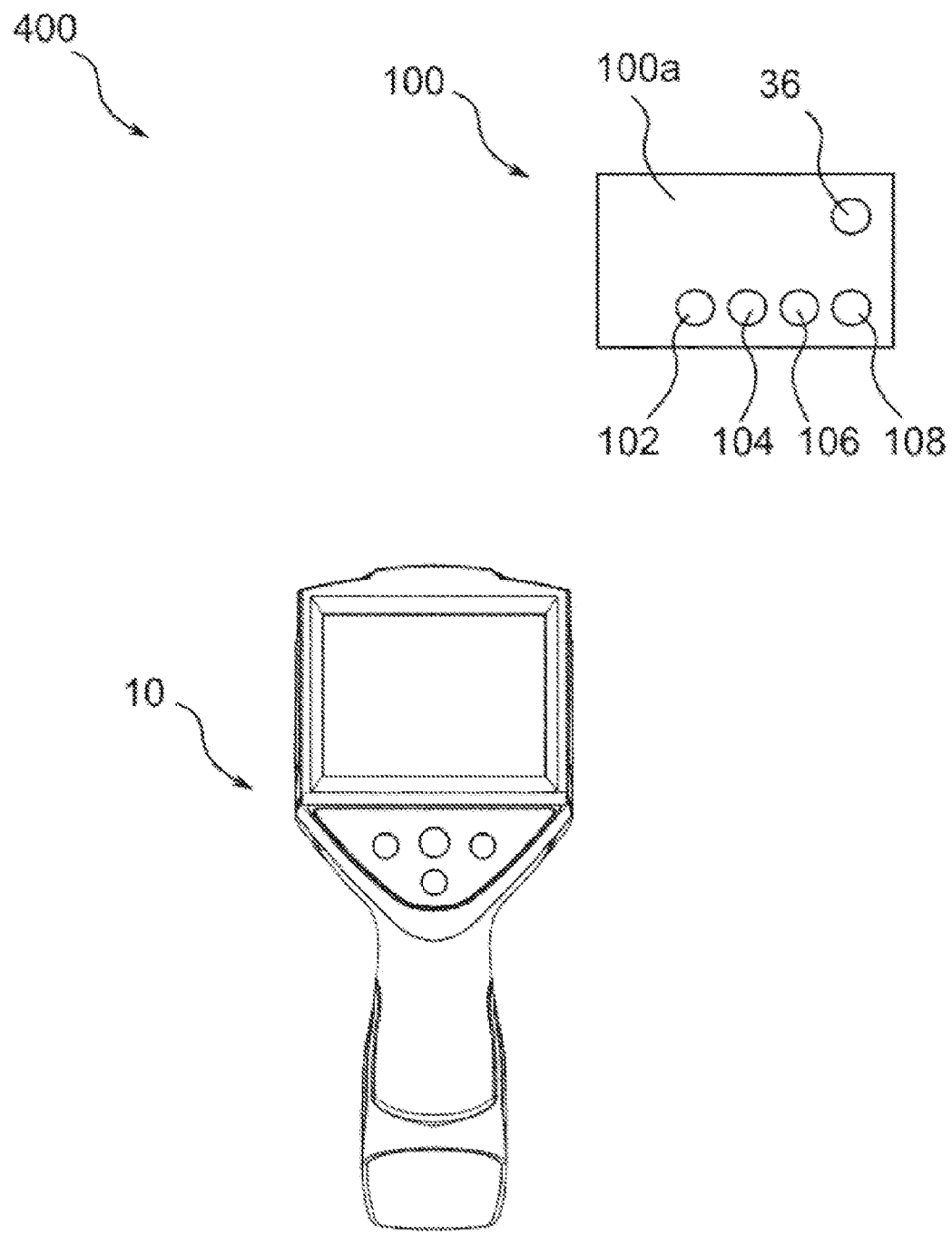
FIG. 4 shows a system comprising a thermal imaging camera according to the disclosure and a sensor system external to the thermal imaging camera.

In an alternative exemplary embodiment (cf. FIG. 4), the sensor system 36 can also be implemented as a sensor system 36 external to the thermal camera 10 in a type of data logger 100 for determining, in particular measuring, ambient humidity information and/or ambient air temperature information, wherein the ambient humidity information and/or the ambient air temperature information is transmitted to the thermal imaging camera 10 using the data communication interface 50 of the thermal imaging camera 10. The external sensor system 36 is housed in a sensor housing 100a, which can measure and transmit ambient humidity information and/or ambient air temperature information by means of independent power supply 102, control device 104, storage device 106, and data communication device 108. The external sensor system 36, the data logger 100 here, for determining ambient humidity information and ambient air temperature information and the handheld thermal imaging camera 10 form a system 400 according to the disclosure in this way.

Figure 5:
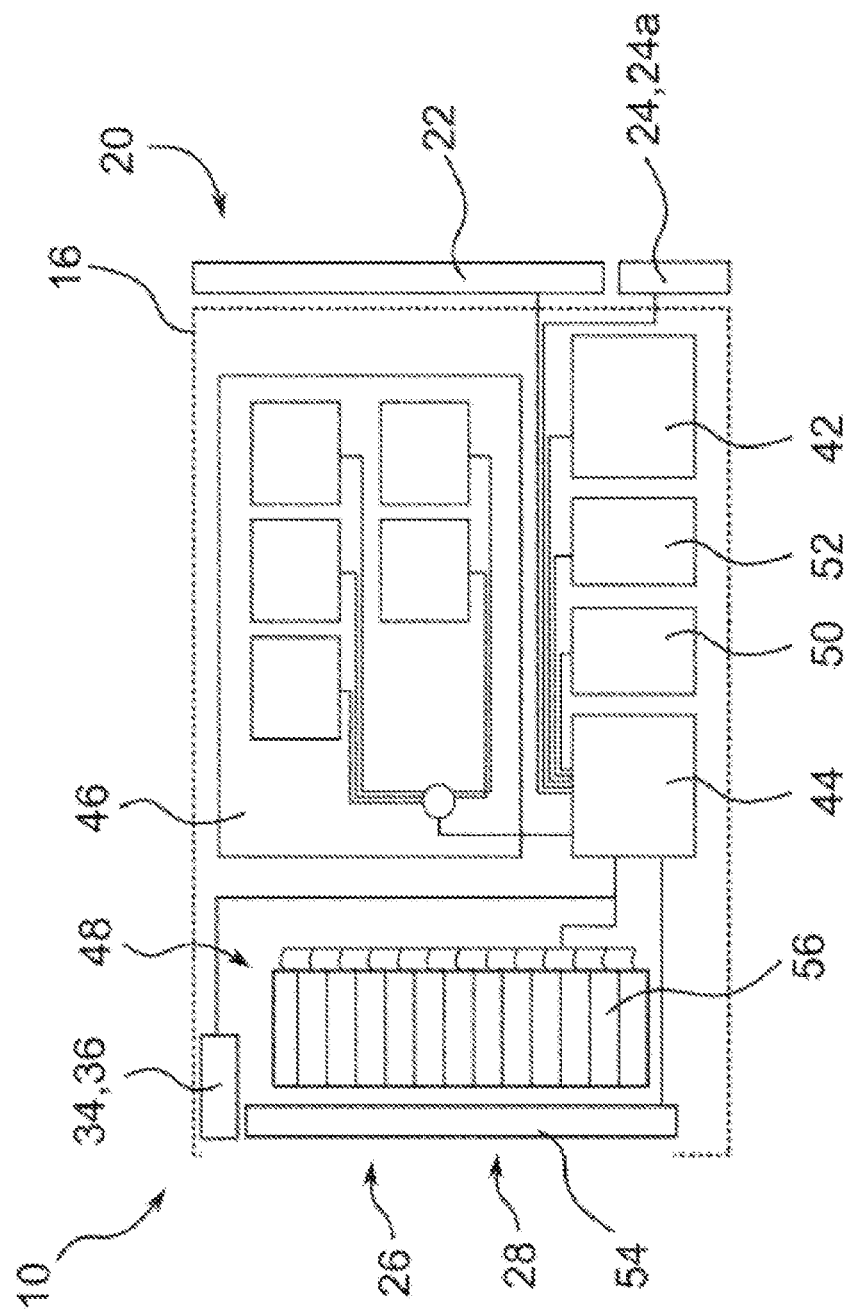
FIG. 5 shows the essential components of an embodiment of the thermal imaging camera according to the disclosure.

As shown in FIG. 5, electrical components of the thermal imaging camera 10 are attached and interconnected in the interior of the thermal imaging camera 10, for example on a printed circuit board. The electrical components comprise at least the sensor system 36, the visual camera 34, a control device 44, an evaluation device 46, and an infrared detector array 48 for detecting infrared radiation entering the entry opening 28 of the thermal imaging camera 10. The control device in particular represents a device which comprises at least a control electronics unit and means for communication with the other components of the thermal imaging camera 10, in particular means for controlling and regulating the thermal imaging camera 10. The control device 44 is connected for signaling to the other components of the thermal imaging camera 10, in particular the infrared detector array 48, the evaluation device 46, a data communication interface 50, the energy storage unit 42, a data memory 52, possibly a shutter mechanism 54 ("shutter"), but also to the operating elements of the input device 24, 24a and the touch-sensitive display screen of the output device 22.

The infrared detector array 48 of the thermal imaging camera 10 consists of a plurality of pixels 56 sensitive to infrared radiation. The pixels 56 are provided for the purpose of capturing infrared radiation from the infrared radiation spectrum which enters the entry opening 28 of the thermal imaging camera 10 (cf. FIG. 3) in the solid angle range 30 originating from the setting 14 to be studied. Each pixel 56 is provided for the purpose of providing an electrical detection signal at the output thereof which correlates with the incident thermal power of the infrared radiation on the pixel 56. These pixel-dependent detection signals are output individually or in combination with other detection signals of other pixels 56 first to the control device 44 of the thermal imaging camera and relayed therefrom to the evaluation device 46 of the thermal imaging camera 10. In the illustrated exemplary embodiment, the pixels 56 are implemented as p/n diodes sensitive to infrared radiation. The pixels 56 of the infrared detector array 48 are advantageously arranged like a matrix on the surface of the infrared detector array 48 facing toward the setting. The number of pixels 56 in the exemplary embodiment shown is in particular 80×80 pixels, preferably 360×240 pixels, particularly preferably 640×480 pixels.

The control device 44 is used to receive and evaluate detection signals of the infrared detector array 48, wherein the control device 44 carries out an evaluation of the two-dimensional temperature information 12a, in particular the thermal image, of the studied setting 14 based on detection signals of at least a majority of pixels 56 illuminated using infrared radiation. The control device 44 includes at least one processor, a memory, and an operating program having evaluation and calculation routines (each not identified in greater detail in FIG. 5). The evaluated two-dimensional temperature information 12a, in particular the generated thermal image, can be provided by the control device 44 for further processing and/or for output to an operator of the thermal imaging camera 10 by means of the output device 22 and/or an external device by means of the data communication interface 50.

The evaluation device 46 is used to receive and evaluate measured values provided by the sensor system 36 on the ambient humidity and ambient air temperature, wherein ambient humidity information and ambient air temperature information are determined. Furthermore, the evaluation device 46 is used to carry out the method according to the disclosure, in particular to calculate two-dimensional information 12b about a mold formation risk, in particular a mold risk map of the setting 14, using a mold growth model and using the two-dimensional temperature information 12a, the ambient humidity information, and the ambient air temperature information.

The method according to the disclosure is explained hereinafter on the basis of an exemplary embodiment which starts from the measurement scenario in FIG. 3, in which an operator of the thermal imaging camera 10 is interested in studying a mold formation risk of the setting 14. The thermal imaging camera 10 is used to detect two-dimensional temperature information 12a of the setting 14 to be studied. The determined two-dimensional temperature information 12a is compiled from a plurality of location-resolved and/or solid-angle-resolved temperature measured values (corresponding pixels of a displayable thermal image). The thermal imaging camera 10 is configured for the purpose of detecting infrared radiation emitted from or in the solid angle range 30 for the contactless determination of the two-dimensional temperature information 12a of the setting 14.

Figure 6:
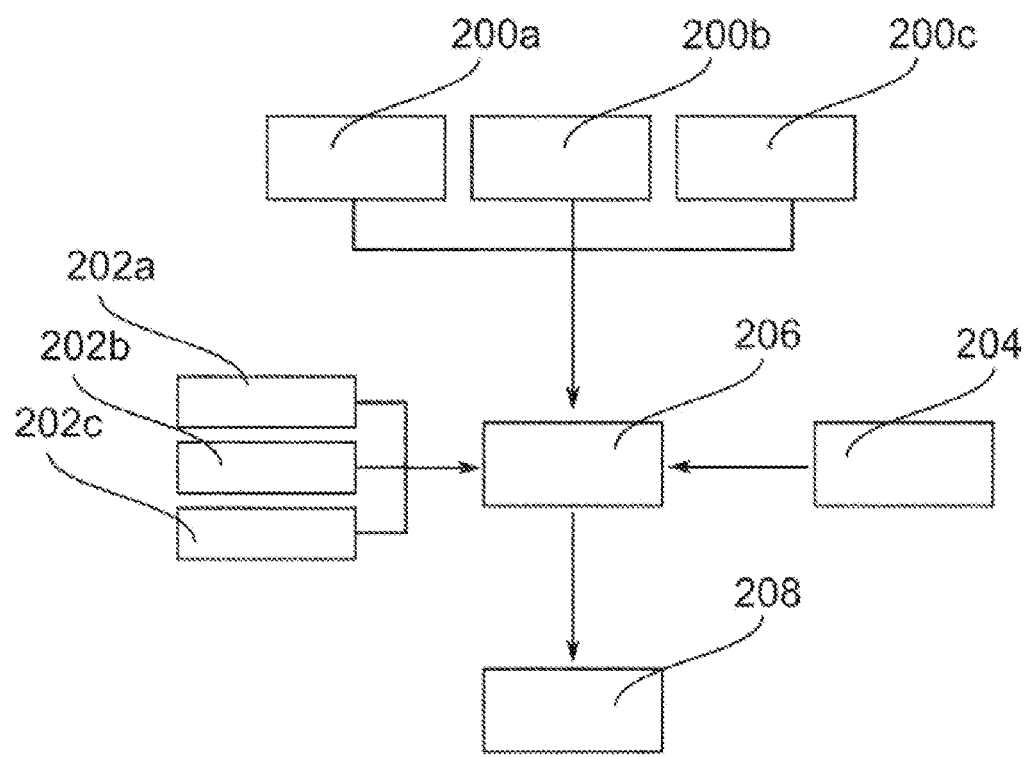
FIG. 6 shows an embodiment of the method according to the disclosure.

FIG. 6 shows a method diagram which illustrates an embodiment of the method according to the disclosure for operating the thermal imaging camera 10. The method is provided to be carried out by a thermal imaging camera 10, as is proposed in conjunction with FIGS. 1 to 5.

Proceeding from the measurement scenario shown in FIG. 3, the operator of the thermal imaging camera 10 for measuring the setting 14 orients the thermal imaging camera 10 on the setting 14 to be studied. In a first method step 200, ambient humidity information and ambient air temperature information are provided to the thermal imaging camera 10. The provision can be carried out by an operator of the thermal imaging camera 10 (method step 200a), who inputs the ambient humidity information and/or the ambient air temperature information directly by means of the input device 24 (for example as numeric values). Alternatively or additionally, the provision of the ambient humidity information and/or the ambient air temperature information can be carried out by means of the sensor system 36 arranged on the thermal imaging camera 10 (cf. FIG. 1) by measurement (method step 200b). Alternatively or additionally, the provision of the ambient humidity information and/or the ambient air temperature information can be carried out by means of a sensor system 36 (cf. FIG. 4) external to the thermal imaging camera 10 by measurement and subsequent transmission using the data communication interface 50 of the thermal imaging camera 10 (method step 200c). In particular, the ambient humidity information and/or the ambient air temperature information can be determined and provided from a long-term measurement of the ambient humidity and/or the ambient air temperature (relates to method steps 200b and 200c, respectively).

In method step 202a, an operator of the thermal imaging camera 10 can specify the mold growth model to be applied, in particular by selection by means of the input device 24. In method step 202b, an operator of the thermal imaging camera 10 can specify a mold warning threshold, also using the input device 24. Furthermore, in method step 202c, an operator of the thermal imaging camera 10 can specify a material characteristic value of the setting 14, for example a substrate material.

In method step 204, the thermal imaging camera 10 measures infrared radiation from the solid angle range 30 by means of the infrared detector array 48. The respective detection signals of the infrared detector array 48 are relayed to the control device 44, by which they are evaluated and subsequently are available for further processing. In particular, in this way two-dimensional temperature information 12a, in particular a thermal image, is determined. In parallel thereto, the thermal imaging camera 10 determines a visual image 12c of the setting 14 using the camera 34.

At least the input variables of the two-dimensional temperature information 12a, the ambient humidity information, and the ambient air temperature information are converted and evaluated in method step 206 using the specified mold growth model to form two-dimensional information 12b about a mold formation risk, in particular a mold risk map of the setting 14.

The determined two-dimensional information 12b about a mold formation risk is output in method step 208 via the display screen of the output device 22 to the operator of the thermal imaging camera 10. The output of the two-dimensional information 12b about a mold formation risk can be carried out superimposed with the two-dimensional temperature information 12a, in particular with the thermal image of the setting 14. Alternatively, the output of the two-dimensional information 12b about a mold formation risk can also be carried out superimposed with the visual image 12c of the setting 14 recorded by means of the camera 34 of the thermal imaging camera 10 (cf. in particular FIG. 7).

It is to be noted that these method steps can run repeatedly. Due to a rapid repetition rate of method steps 200 to 208, the evaluation results 12 output to the operator on the display screen of the output device 22 appear like a continuously updated image, in particular like a "live mode" of the setting 14.

After actuating an operating element of the input device 24, in particular the button 24a, it can be provided that the thermal imaging camera 10 freezes the last determined and displayed output result 12, so that, even upon further movement of the thermal imaging camera 10 in space, the output results 12 displayed on the display screen are no longer updated.

Simultaneously or subsequently, it can be provided that the evaluation and/or the output of the two-dimensional information 12b about the mold formation risk is restricted in accordance with a mold warning threshold specified by the operator to those regions 58 of the setting 14 for which a mold formation risk is above the defined mold warning threshold.

Figure 7:
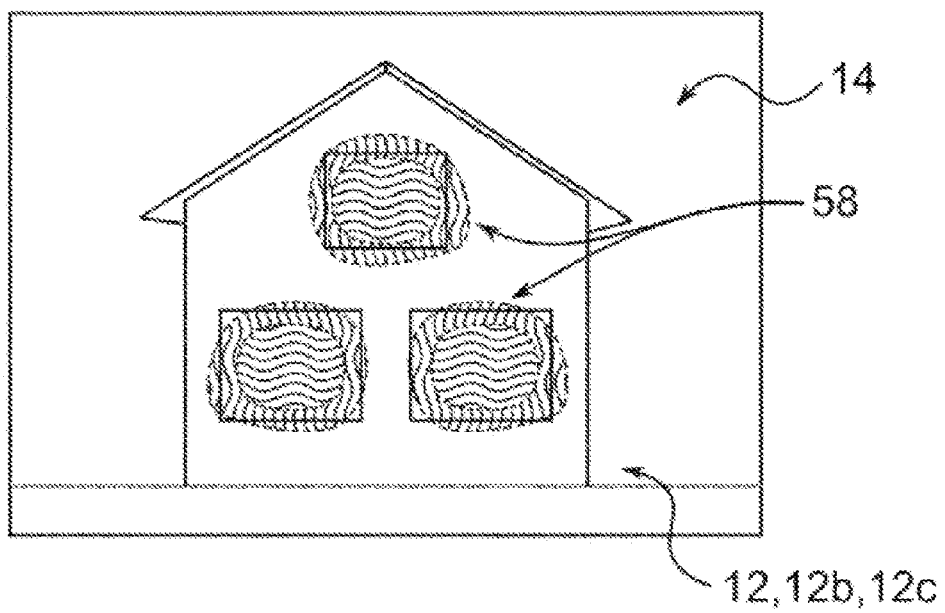
FIG. 7 shows a schematic illustration of a representation of two-dimensional information about a mold formation risk as an overlay with a visual image.

FIG. 7 schematically shows a setting 14 studied by means of the thermal imaging camera 10, as it is output to an operator by means of the output device 22 of the thermal imaging camera 10. The output representation is implemented as a superposition of the two-dimensional information 12b about a mold formation risk, in particular the mold risk map of the setting 14, with a visual image 12c of the setting 14 recorded by means of the camera 34 of the thermal imaging camera 10. The regions 58 of increased mold risk are shown in color, illustrated as shading here. The setting 14 consists by way of example of a house façade, which is to be studied. The thermal imaging camera 10, as also shown in FIG. 3, is positioned in front of the setting 14 in such a way that the entire house façade is covered by the solid angle range 30, so that two-dimensional information completely characterizing the house façade about a mold formation risk 12b can be determined (method step 206 in FIG. 6) from measured infrared radiation (method step 204 in FIG. 6) of the house façade. The representation of the two-dimensional information about the mold formation risk is reduced in consideration of the mold warning threshold in such a way that only the highest-risk regions 58 are output in the superimposed representation. The regions for which a low mold formation risk is determined are omitted in the representation.

The invention claimed is:

1. A method for operating a thermal imaging camera, comprising:
    measuring two-dimensional temperature information comprising a thermal image of a setting using an infrared detector array of the thermal imaging camera, the infrared detector array including a plurality of pixels sensitive to infrared radiation;
    providing at least one of ambient humidity information and ambient air temperature information;
    specifying a selected mold growth model of a plurality of mold growth models using an input device mounted on a housing of the thermal imaging camera; and
    calculating a mold risk map of the setting using the selected mold growth model based on the measured two-dimensional temperature information, and the provided at least one of ambient humidity information and the ambient air temperature information,
    wherein the mold risk map includes two dimensional information about a mold formation risk, and
    wherein the plurality of mold growth models includes an isopleth mold growth model and a Viitanen mold growth model.

2. The method as claimed in claim 1, further comprising: specifying a mold warning threshold using the input device.

3. The method as claimed in claim 1, wherein the at least one of the ambient humidity information and the ambient air temperature information is provided using the input device.

4. The method as claimed in claim 1, wherein:
the at least one of the ambient humidity information and the ambient air temperature information is provided using a sensor system configured to determine the at least one of the ambient humidity information and ambient air temperature information, and
the sensor system is arranged in the or on the thermal imaging camera.

5. The method as claimed in claim 1, wherein the at least one of the ambient humidity information and the ambient air temperature information is measured and transmitted by a sensor system which is spaced apart from the thermal imaging camera and is connected to the thermal imaging camera in a wireless manner.

6. The method as claimed in claim 1, wherein the at least one of the ambient humidity information and the ambient air temperature information is determined and provided from a long-term measurement of the at least one of the ambient humidity and the ambient air temperature.

7. The method as claimed in claim 1, further comprising:
specifying a material characteristic value of the setting using the input device,
wherein the material characteristic value includes at least one of a roughness of the setting, a porosity of the setting, and a pH value of the setting.

8. The method as claimed in claim 1, further comprising:
outputting the mold risk map of the setting on a display screen of the thermal imaging camera overlaid with the thermal image of the setting.

9. The method as claimed in claim 1, further comprising:
outputting the mold risk map of the setting on a display screen of the thermal imaging camera overlaid with a visual image of the setting recorded using a camera of the thermal imaging camera.

10. The method as claimed in claim 1, wherein the plurality of mold growth models is stored on an external database.

11. The method as claimed in claim 1, wherein the setting is an entire façade of a house.

12. A handheld thermal imaging camera for contactless determination of a mold risk map of a setting, comprising:
at least one infrared detector array including a plurality of pixels sensitive to infrared radiation;
an input device; and
an evaluation device operably connected to the at least one infrared detector array and the input device, the evaluation device configured to
calculate two-dimensional temperature information comprising a thermal image of the setting using the at least one infrared detector array,
determine at least one of ambient humidity information and ambient air temperature information,
determine a selected mold growth model of a plurality of mold growth models based on an input from the input device, and
calculate the mold risk map of the setting using the selected mold growth model based on the calculated two-dimensional temperature information, and the determined at least one of ambient humidity information and ambient air temperature information,
wherein the mold risk map includes two dimensional information about a mold formation risk, and
wherein the plurality of mold growth models includes an isopleth mold growth model and a Viitanen mold growth model.

13. The handheld thermal imaging camera as claimed in claim 12, further comprising:
a sensor system, arranged in the or on the thermal imaging camera, and configured to determine at least one of the ambient humidity information and the ambient air temperature information.

14. The handheld thermal imaging camera as claimed in claim 12, further comprising:
a housing in which the at least one infrared detector array, the input device, and the evaluation device are at least partially located; and
a data communication interface mounted on the housing and configured to receive the at least one of ambient humidity information and ambient air temperature information from a sensor system which is spaced apart from the thermal imaging camera and is connected to the thermal imaging camera in a wireless manner.

15. A system, comprising:
at least one handheld thermal imaging camera including
at least one infrared detector array including a plurality of pixels sensitive to infrared radiation,
an input device, and
an evaluation device configured to
calculate two-dimensional temperature information comprising a thermal image of the setting using the at least one infrared detector array,
determine at least one of ambient humidity information and ambient air temperature information,
determine a selected mold growth model of a plurality of mold growth models based on an input from the input device, and
calculate a mold risk map of the setting using the selected mold growth model based on the calculated two-dimensional temperature information, and the determined at least one of ambient humidity information and ambient air temperature information; and
a sensor system external to the at least one thermal imaging camera and configured to determine at least one of the ambient humidity information and the ambient air temperature information,
wherein the mold risk map includes two dimensional information about a mold formation risk, and
wherein the plurality of mold growth models includes an isopleth mold growth model and a Viitanen mold growth model.

* * * * *